(12) United States Patent
Yamamoto

(10) Patent No.: US 11,614,591 B2
(45) Date of Patent: Mar. 28, 2023

(54) OPTICAL WAVEGUIDE DEVICE, AND OPTICAL COMMUNICATION APPARATUS

(71) Applicant: SHINKO ELECTRIC INDUSTRIES CO., LTD., Nagano (JP)

(72) Inventor: Kazunao Yamamoto, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 17/534,537

(22) Filed: Nov. 24, 2021

(65) Prior Publication Data

US 2022/0163739 A1    May 26, 2022

(30) Foreign Application Priority Data

Nov. 26, 2020   (JP) .............................. JP2020-195874

(51) Int. Cl.
*G02B 6/42*    (2006.01)
*G02B 6/43*    (2006.01)

(52) U.S. Cl.
CPC ........... *G02B 6/4214* (2013.01); *G02B 6/428* (2013.01); *G02B 6/43* (2013.01)

(58) Field of Classification Search
CPC .... G02B 6/125; G02B 6/4214; G02B 6/4249; G02B 6/428; G02B 6/43
See application file for complete search history.

(56) References Cited

U.S. PATENT DOCUMENTS

| | | | | |
|---|---|---|---|---|
| 7,734,124 B2* | 6/2010 | Yonekura | ............ | G02B 6/4214 |
| | | | | 385/14 |
| 8,942,520 B2* | 1/2015 | Matsuoka | ................ | G02B 6/43 |
| | | | | 438/24 |
| 2009/0074354 A1 | 3/2009 | Yanagisawa | | |
| 2017/0293096 A1 | 10/2017 | Yamamoto | | |

FOREIGN PATENT DOCUMENTS

| | | |
|---|---|---|
| JP | 2009-069668 | 4/2009 |
| JP | 2017-187620 | 10/2017 |

* cited by examiner

*Primary Examiner* — Michael P Mooney
(74) *Attorney, Agent, or Firm* — Rankin, Hill & Clark LLP

(57) ABSTRACT

An optical waveguide device includes: a wiring board; a first cladding layer that is formed on the wiring board; a plurality of second cladding layers that are formed on the first cladding layer; a plurality of protrusions each of which is formed on a corresponding one of the second cladding layers and each of which is provided with an inclined face inclined to a front face of the corresponding second cladding layer; a plurality of optical path converting mirrors each of which is formed on a corresponding one of the inclined faces of the protrusions; a plurality of core layers each of which is formed on a corresponding one of the second cladding layers and each of which directly contacts the corresponding optical path converting mirror; and a third cladding layer that is formed on the second cladding layers and the core layers.

8 Claims, 14 Drawing Sheets

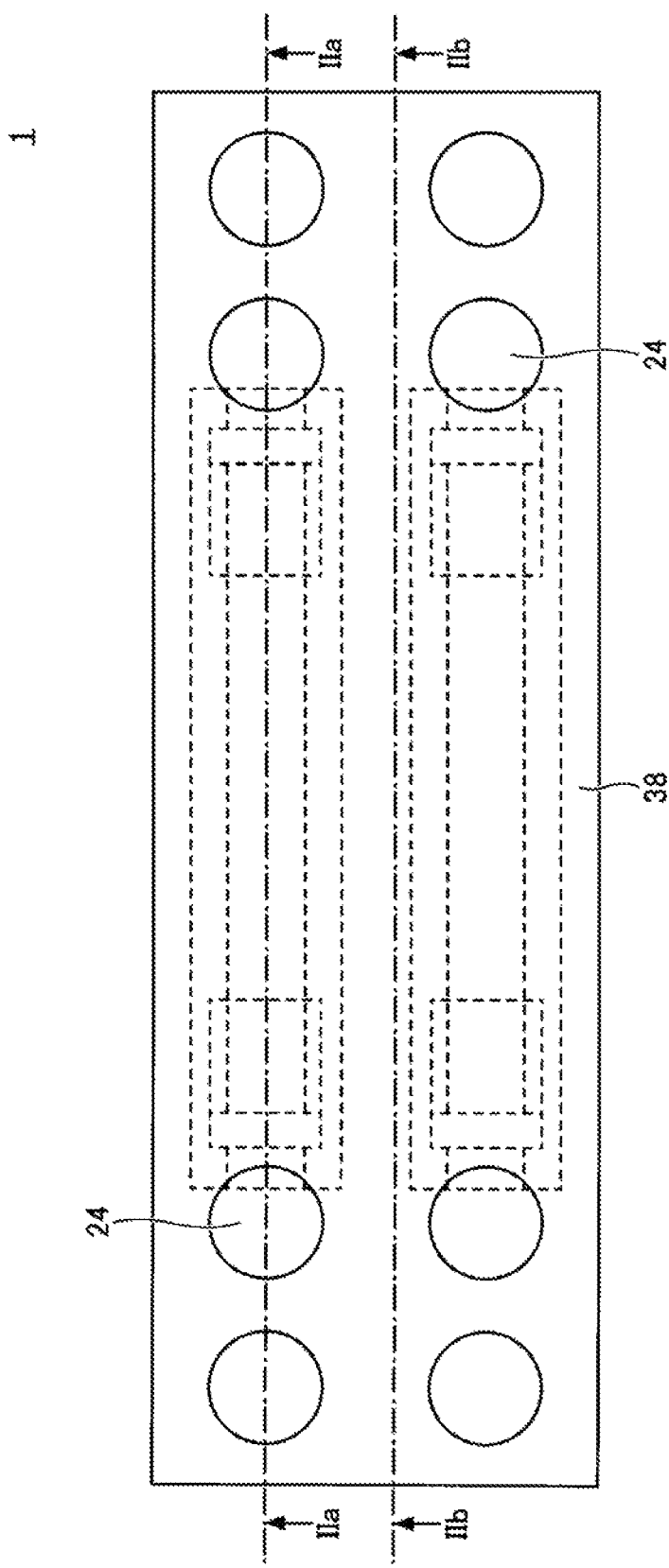

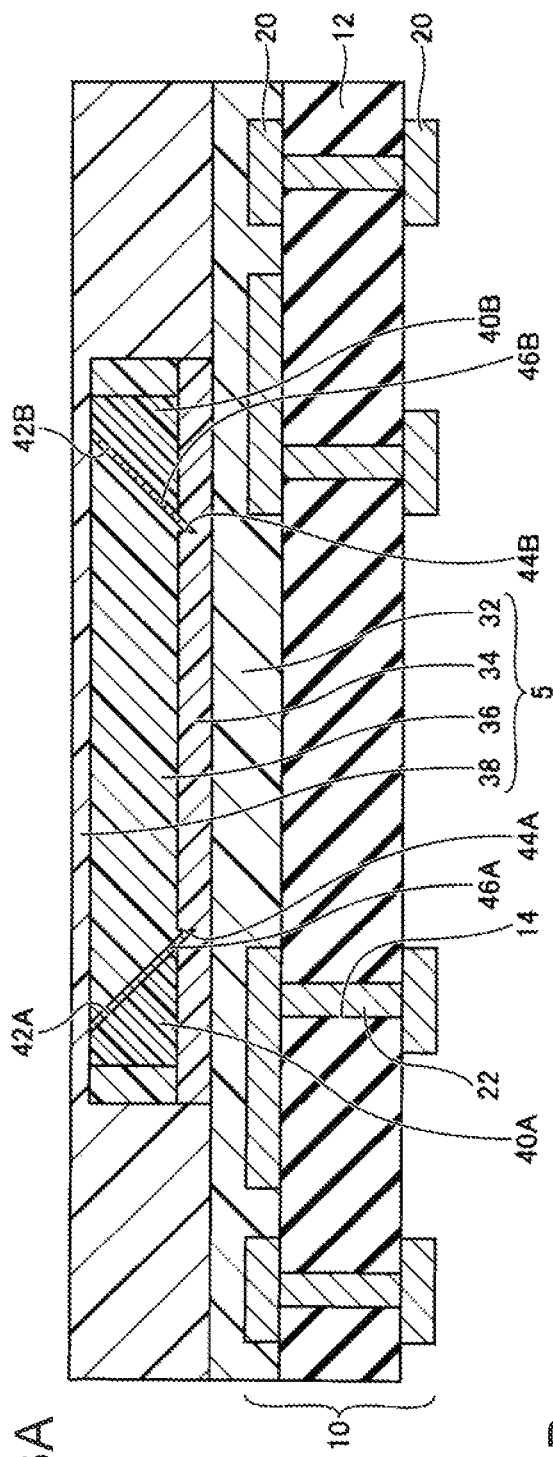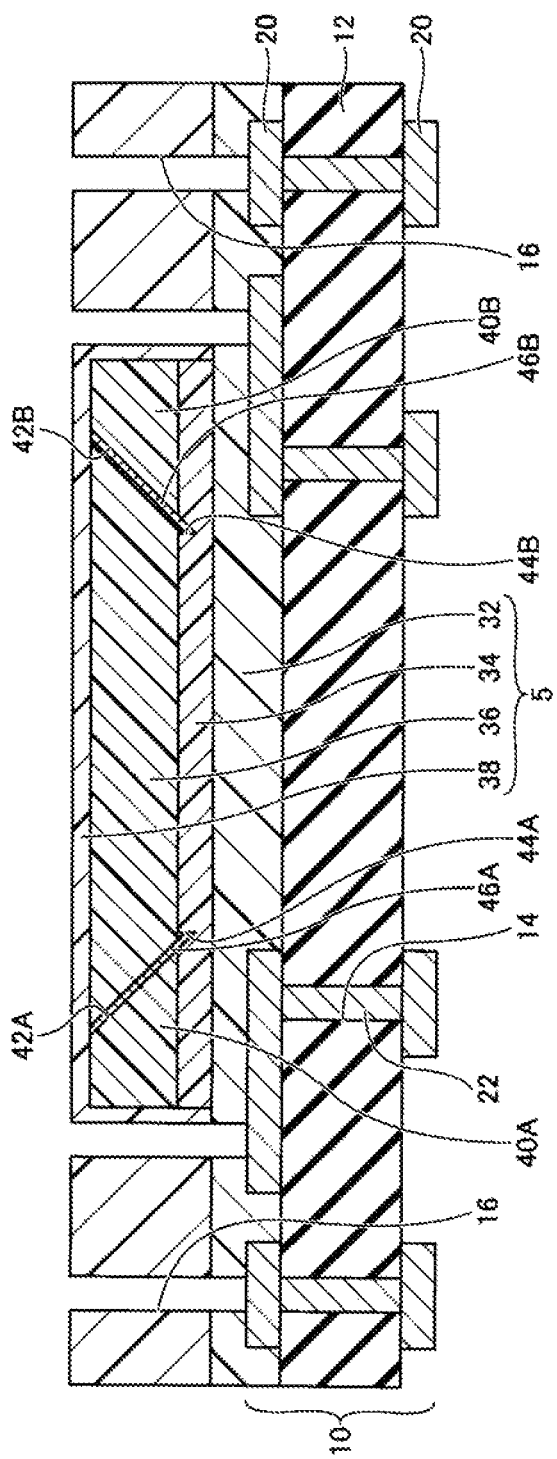

OPTICAL WAVEGUIDE DEVICE, AND OPTICAL COMMUNICATION APPARATUS

This application claims priority from Japanese Patent Application No. 2020-195874, filed on Nov. 26, 2020, the entire contents of which are herein incorporated by reference.

BACKGROUND

Technical Field

The present disclosure relates to an optical waveguide device, and an optical communication apparatus.

Background Art

There is an optical waveguide device in which an optical waveguide handling an optical signal is formed on a wiring board handling an electrical signal. The optical waveguide device serving as a photoelectric hybrid board can transmit a high-speed portion of the electrical signal in the form of the optical signal to compensate for a limit in the transmission speed of the electrical signal.

Optical path converting mirrors are disposed on opposite end sides of the optical waveguide, and optical elements are mounted on the wiring board to be respectively optically coupled to the optical path converting mirrors of the optical waveguide (see e.g., JP-A-2009-69668 and JP-A-2017-187620).

In manufacturing the optical waveguide device, a plurality of protrusions are cut by a rotary blade of a cutting device so as to form inclined faces on which the optical path converting mirrors will be provided. On this occasion, the rotary blade also cuts a lower cladding layer that does not need to be cut. Therefore, the rotary blade wears out quickly, resulting in a problem of high cost. In addition, the rotary blade may penetrate the lower cladding layer under the protrusions and reach a wiring layer of the wiring board. In this case, delamination may occur at an interface between the wiring layer and the cladding layer.

SUMMARY

A certain embodiment provides an optical waveguide device.

The optical waveguide device comprises:
a wiring board;
a first cladding layer that is formed on the wiring board;
a plurality of second cladding layers that are formed on the first cladding layer;
a plurality of protrusions each of which is formed on a corresponding one of the second cladding layers and each of which is provided with an inclined face inclined to a front face of the corresponding second cladding layer;
a plurality of optical path converting mirrors each of which is formed on a corresponding one of the inclined faces of the protrusions;
a plurality of core layers each of which is formed on a corresponding one of the second cladding layers and each of which directly contacts the corresponding optical path converting mirror; and
a third cladding layer that is formed on the second cladding layers and the core layers.

A certain embodiment provides an optical communication apparatus. The optical communication apparatus comprises: an optical waveguide device and a plurality of optical elements.

The optical waveguide device comprises:
a wiring board;
a first cladding layer that is formed on the wiring board;
a plurality of second cladding layers that are formed on the first cladding layer;
a plurality of protrusions each of which is formed on a corresponding one of the second cladding layers and each of which is provided with an inclined face inclined to a front face of the corresponding second cladding layer;
a plurality of optical path converting mirrors each of which is formed on a corresponding one of the inclined faces of the protrusions;
a plurality of core layers each of which is formed on a corresponding one of the second cladding layers and each of which directly contacts the corresponding optical path converting mirror; and
a third cladding layer that is formed on the second cladding layers and the core layers.

Each of the optical elements is optically coupled to the corresponding optical path converting mirror.

A certain embodiment provides an optical waveguide device.

The optical waveguide device comprises:
a wiling board;
a first cladding layer that is formed on the wiring board;
a plurality of second cladding layers that are formed on the first cladding layer;
a plurality of first protrusions each of which is formed on a corresponding one of the second cladding layers and each of which is provided with a first inclined face inclined to a front face of the corresponding second cladding layer;
a plurality of second protrusions each of which is formed on a corresponding one of the second cladding layers and each of which is provided with a second inclined face inclined to a front face of the corresponding second cladding layer;
a plurality of first optical path converting mirrors each of which is formed on a corresponding one of the inclined faces of the first protrusions;
a plurality of second optical path converting mirrors each of which is formed on a corresponding one of the inclined faces of the second protrusions;
a plurality of core layers each of which is formed on a corresponding one of the second cladding layers and each of which directly contacts the corresponding first optical path converting mirror and the corresponding second optical path converting mirror; and
a third cladding layer that is formed on the second cladding layers and the core layers.

BRIEF DESCRIPTION OF THE DRAWINGS

FIG. 1 is a top view showing an optical waveguide device according to a first embodiment;

FIGS. 13A and 13B are views showing the method for manufacturing the optical waveguide device according to the first embodiment (Part 11)

DESCRIPTION OF EMBODIMENTS

Embodiments will be specifically described below with reference to the accompanying drawings, Incidentally, in description of the present disclosure and the drawings, the same reference signs will be affixed to constituent elements having substantially the same functional configurations, so that duplicate description thereof may be omitted.

Embodiment 1

Figure 2A:
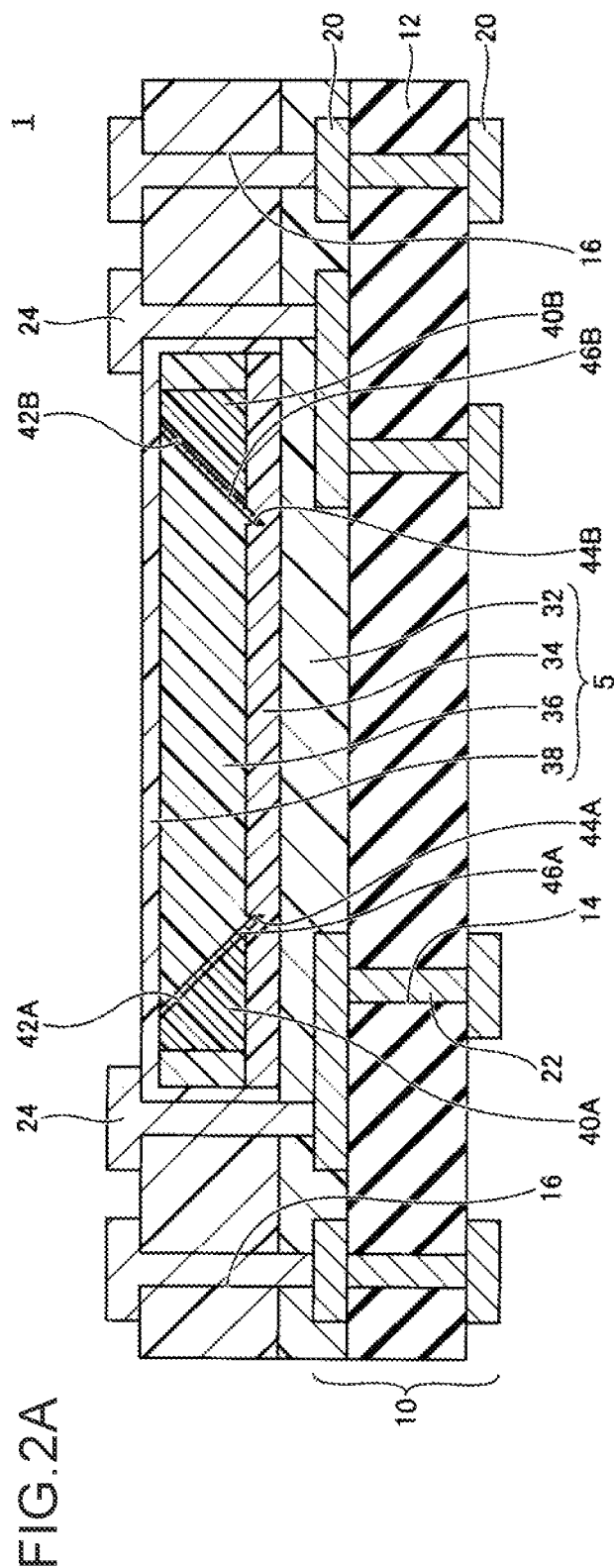
FIGS. 2A and 2B are sectional views showing the optical waveguide device according to the first embodiment.
Figure 2B:
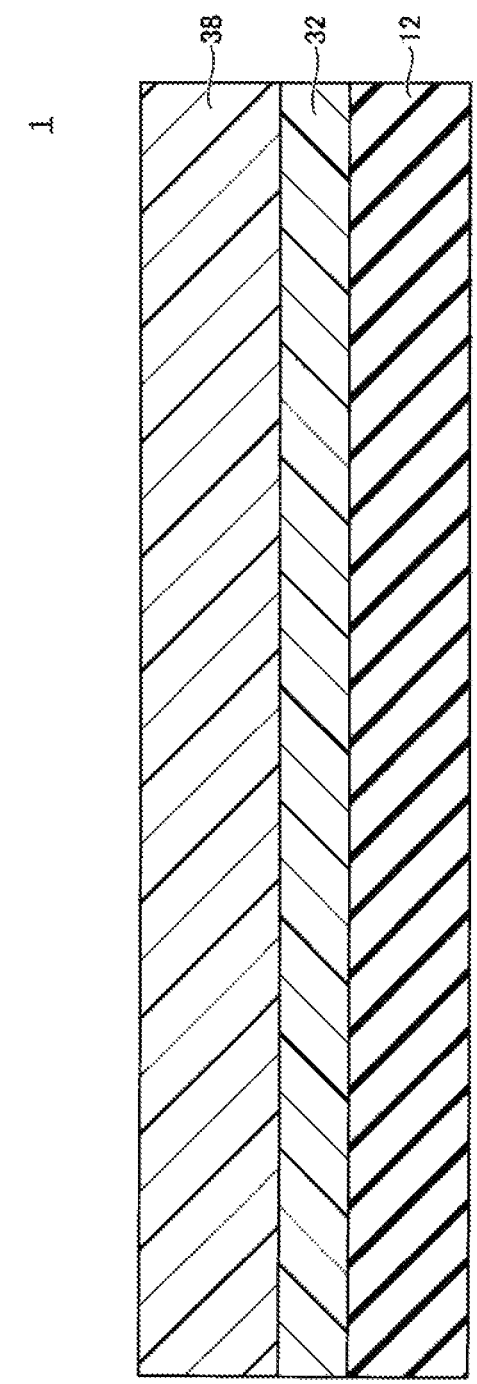

First, a first embodiment will be described. The first embodiment relates to an optical waveguide device, FIG. 1 is a top view showing the optical waveguide device according to the first embodiment. FIGS. 2A and 2B are sectional views showing the optical waveguide device according to the first embodiment. FIG. 2A corresponds to a sectional view taken along a line IIa-IIa in FIG. 1, and FIG. 2B corresponds to a sectional view along a line in FIG. 1.

As shown in FIG. 1 and FIGS. 2A and 2B, the optical waveguide device 1 according to the first embodiment has a wiring board 10. The wiring board 10 has a substrate 12, and wiring layers 20 formed on opposite faces of the substrate 12 respectively. Through holes 14 penetrating the substrate 12 in a thickness direction are provided in the substrate 12. Each of the through holes 14 is filled with a through conductor 22. The wiring layer 20 on one of the opposite faces is connected to the wiring layer 20 on the other face through the through conductors 22. The wiring layers 20 and the through conductors 22 are formed from copper or the like.

The wiring layer 20 on one of the opposite faces may be connected to the wiring layer 20 on the other face through through-hole plating layers formed on side walls of ones of the through holes 14, and the other through holes 14 may be filled with a resin.

The substrate 12 may be a rigid substrate or a flexible substrate. When the substrate 12 is the rigid substrate, the substrate 12 is, for example, formed from a glass epoxy resin or the like. When the substrate 12 is the flexible substrate, the substrate 12 is, for example, formed from a polyimide film or the like. In addition, the number of the wiring layers 20 formed on each of the opposite faces of the substrate 12 can be set desirably.

A first cladding layer 32 is formed in an optical waveguide formation region on one face of the wiring board 10. The first cladding layer 32 is, for example, about 10 μm to 30 μm thick. Hereinafter, the side on which the first cladding layer 32 is formed as seen from the wiring board 10 may be referred to as front side or upper side, and an opposite side thereto may be referred to as back side or lower side. The first cladding layer 32 may be formed on the entire front face of the wiring board 10.

A plurality of second cladding layers 34 are selectively formed on a front face of the first cladding layer 32. The plurality of second cladding layers 34 are disposed side by side, for example, in a first direction and extend in a second direction intersecting the first direction. For example, the first direction and the second direction are orthogonal to each other. Each of the second cladding layers 34 is, for example, about 5 μm to 15 μm thick.

Protrusions 40A and 40B are formed on a front face of each of the second cladding layers 34. In other words, two protrusions are formed on the front face of the second cladding layer 34. For example, the protrusions 40A and 40B are formed in an optical path converting mirror formation region on the second cladding layer 34. The protrusions 40A and 40B are disposed, for example, to be separate from each other in the second direction. For example, in the second direction, the protrusion 40A is provided on one end portion of the second cladding layer 34 and the protrusion 40B is provided on the other end portion of the second cladding layer 34. For example, the plurality of protrusions 40A are disposed side by side in the first direction and the plurality of protrusions 40B are disposed side by side in the first direction. Each of the protrusions 40A and 40B is, for example, about 30 μm to 40 μm thick.

Each of the protrusions 40A has an inclined face 42A on the protrusion 40B side, and each of the protrusions 40B has an inclined face 42B on the protrusion 40A side. Each of the inclined faces 42A and 42B, for example, converts an optical path by 90°. The inclined faces 42A and 42B are suitably inclined at 45° to the front face of the wiring board 10. A notch 44A continued to the inclined face 42A and a notch 44B continued to the inclined face 42B are formed in the second cladding layer 34. The notches 44A and 44B extend, for example, in the first direction. The bottoms of the notches 44A and 44B are located above a back face of the second cladding layer 34, and the notches 44A and 44B do not reach the first cladding layer 32.

An optical path converting mirror 46A is formed on the inclined face 42A, and an optical path converting mirror 46B is formed on the inclined face 42B, The inclined faces 42A and 42B are inclined so that, for example, light incident on one of the optical path converting mirrors 46A and 46B from above is reflected toward the other light path converting mirror 46A, 46B, and the reflected light is reflected upward by the other optical path converting mirror 46A, 46B. Examples of the material of the optical path converting mirrors 46A and 46B include gold, aluminum, etc.

A core layer 36 is formed on each of the second cladding layers 34. For example, the core layer 36 extends in the second direction. The core layer 36 directly contacts the optical path converting mirrors 46A and 46B. Thickness of the core layer 36 is about the same as the thickness of the protrusions 40A and 40B to measure, for example, about 30 μm to 40 μm.

A third cladding layer 38 is formed on the first cladding layer 32, the second cladding layer 34, and the core layer 36. The third cladding layer 38 covers the core layer 36. For example, the third cladding layer 38 on the core layer 36 is about 10 µm to 30 µm thick.

An optical waveguide 5 includes the first cladding layer 32, the second cladding layer 34, the core layer 36, and the third cladding layer 38. The optical waveguide 5 has a structure in which the core layer 36 is surrounded by the second cladding layer 34 and the third cladding layer 38. The refractive index of the core layer 36 is higher than each of the refractive indices of the first cladding layer 32, the second cladding layer 34, and the third cladding layer 38.

Connection holes 16, which reach the wiring layer 20 of the wiring board 10, are formed in the third cladding layer 38 and the first cladding layer 32. In addition, connection pads 24, which are connected to the wiring layer 20 of the wiring board 10 through via conductors in the connection holes 16, are formed on the third cladding layer 38.

Next, a method for manufacturing the optical waveguide device according to the first embodiment will be described. FIG. 3A to FIG. 13B are views showing the method for manufacturing the optical waveguide device according to the first embodiment.

Figure 3A:
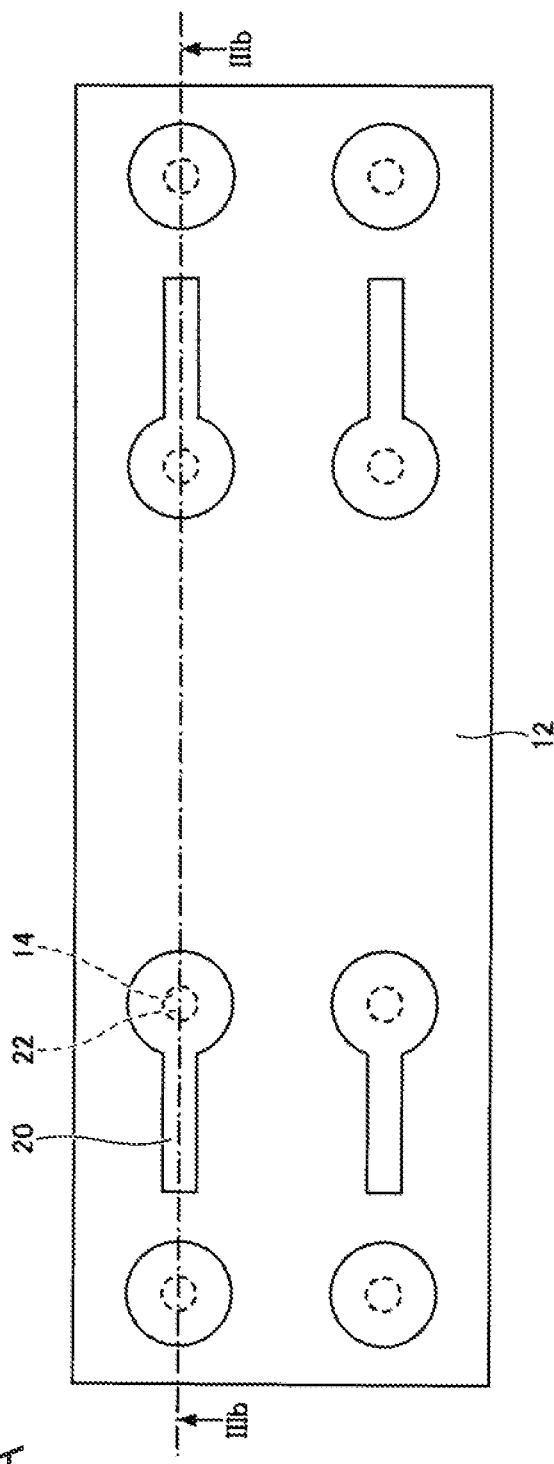
FIGS. 3A and 3B are views showing a method for manufacturing the optical waveguide device according to the first embodiment (Part 1)
Figure 3B:
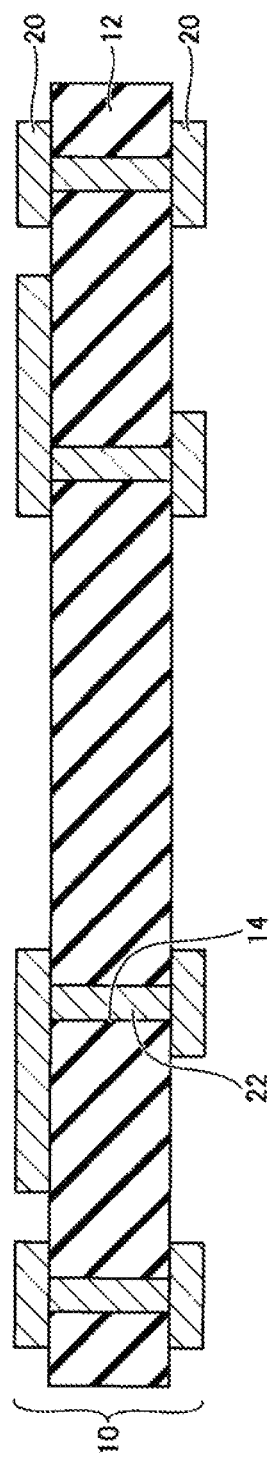

First, as shown in FIGS. 3A and 3B, a wiring board 10 for handling electrical signals is prepared. FIG. 3A is a top view, and FIG. 3B is a sectional view taken along a line IIIb-IIIb in FIG. 3A. As described above, the wiring board 10 includes a substrate 12, and wiring layers 20 that are respectively formed on opposite faces of the substrate 12. Through holes 14 penetrating the substrate 12 in a thickness direction are provided in the substrate 12, and the through holes 14 are filled with through conductors 22 respectively.

The through holes 14 of the wiring board 10 are formed by a drill, a laser, or the like, and the wiring layers 20 and the through conductors 22 are formed using photolithography and a plating technique or the like.

Figure 4A:
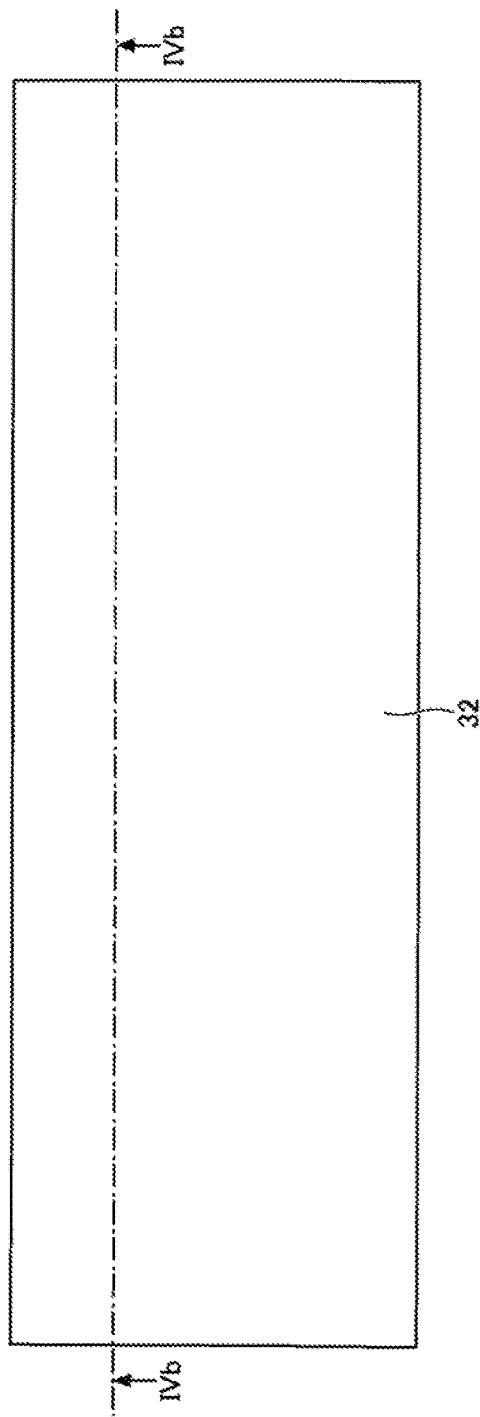
FIGS. 4A and 4B are views showing the method for manufacturing the optical waveguide device according to the first embodiment (Part 2)
Figure 4B:
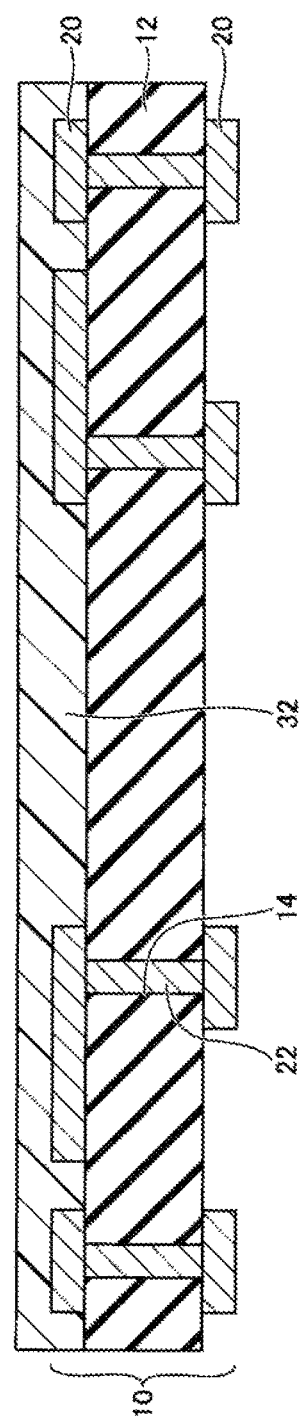

Next, as shown in FIGS. 4A and 4B, a first cladding layer 32 is formed in an optical waveguide formation region on the wiring board 10. FIG. 4A is a top view, and FIG. 4B is a sectional view taken along a line IVb-IVb in FIG. 4A. To form the first cladding layer 32, a photosensitive resin layer (not shown) for obtaining the first cladding layer 32 is formed on the wiring board 10, and exposed to light and developed based on photolithography. Thereafter, the photosensitive resin layer is cured by a heat treatment at about 100° C. to 140° C.

As the photosensitive resin layer, an ultraviolet (UV)-curable epoxy resin or the like is suitably used. As a method for forming the photosensitive resin layer, a semi-cured (B-stage) photosensitive resin sheet may be pasted, or a liquid photosensitive resin may be applied.

A non-photosensitive resin ay be used when the first cladding layer 32 is not patterned but formed all over the face.

A similar resin or the same resin is also suitably used in undermentioned steps of forming second cladding layers 34, protrusions 40A and 40B, core layers 36 and a third cladding layer 38.

Figure 5A:
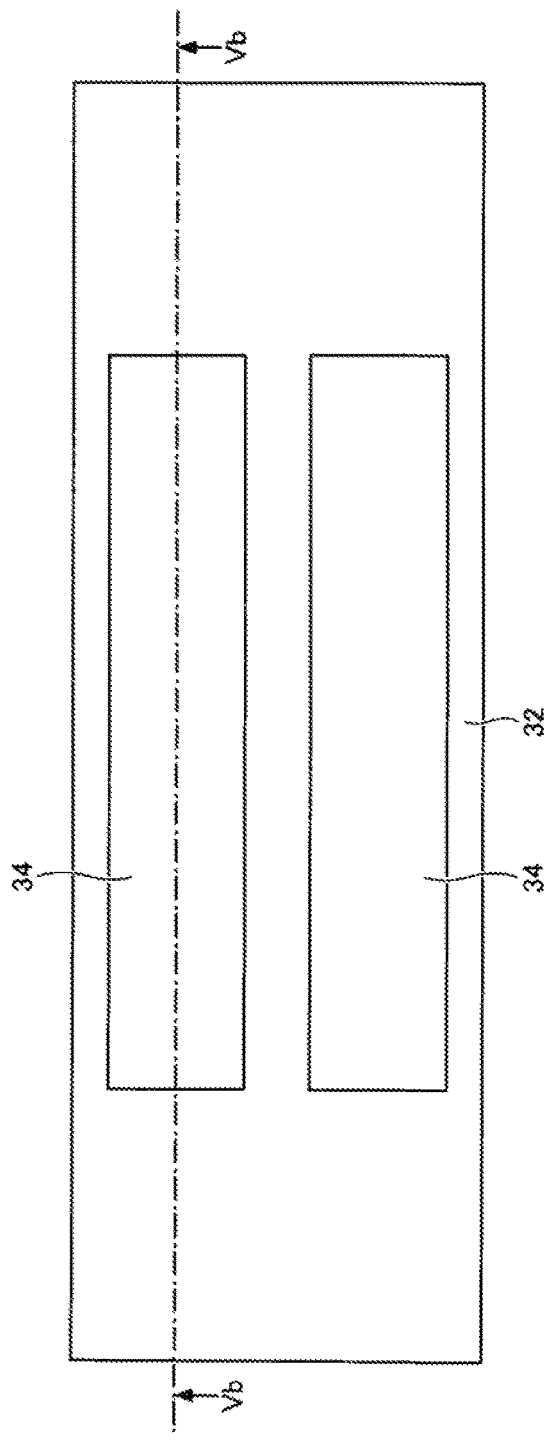
FIGS. 5A and 5B are views showing the method for manufacturing the optical waveguide device according to the first embodiment (Part 3)
Figure 5B:
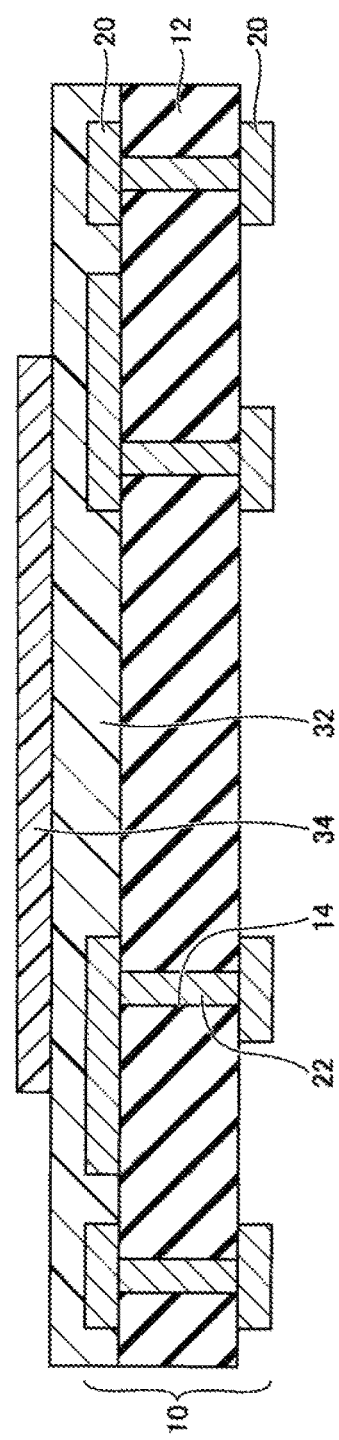

Successively, as shown in FIGS. 5A and 5B, the plurality of second cladding layers 34 are selectively formed on the first cladding layer 32. FIG. 5A is a top view, and FIG. 5B is a sectional view taken along a line Vb-Vb in FIG. 5A, To form the second cladding layers 34, photosensitive resin layers (not shown) for obtaining the second cladding layers 34 are formed on the first cladding layer 32, and exposed to light and developed based on photolithography. Thereafter, the photosensitive resin layers are cured by a heat treatment at about 100° C. to 140° C.

The plurality of second cladding layers 34 are, for example, arranged side by side in a first direction, and formed to extend in a second direction. Of the optical waveguide formation region, a region in which two core layers 36 will be disposed is partially shown in FIG. 5A.

Figure 6A:
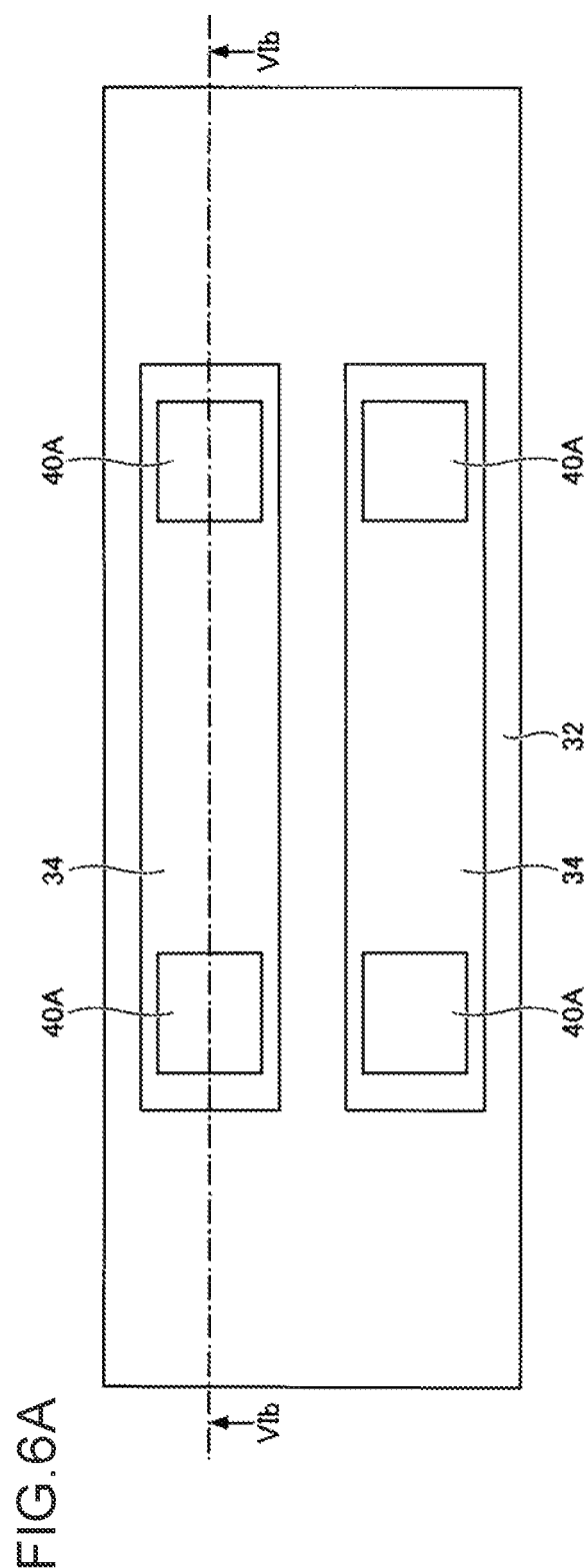
FIGS. 6A and 6B are views showing the method for manufacturing the optical waveguide device according to the first embodiment (Part 4)
Figure 6B:
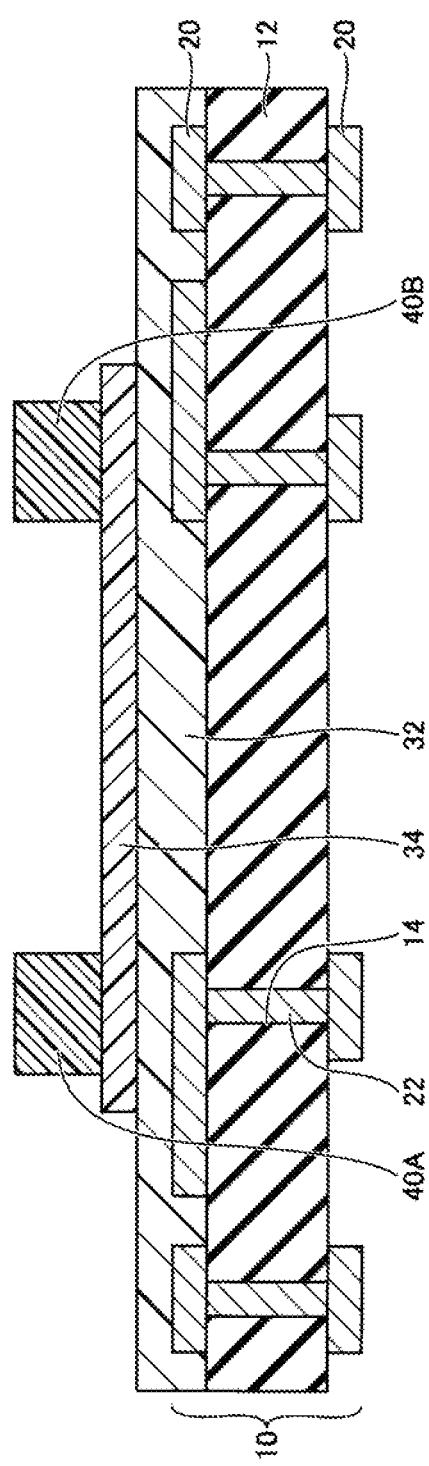

Next, as shown in FIGS. 6A and 6B, protrusions 40A and 40B are formed in each of optical path converting mirror formation regions on the second cladding layers 34. One set of the protrusions 40A and 40B is formed on each of the second cladding layers 34. FIG. 6A is a top view, and FIG. 6B is a sectional view taken along a line VIb-VIb in FIG. 6A. To form the protrusions 40A and 40B, photosensitive resin layers not shown) for obtaining the protrusions 40A and 40B are formed on the second cladding layers 34, and exposed to light and developed based on photolithography. Thereafter, the photosensitive resin layers are cured by a heat treatment at about 100° C. to 140° C.

Figure 7:
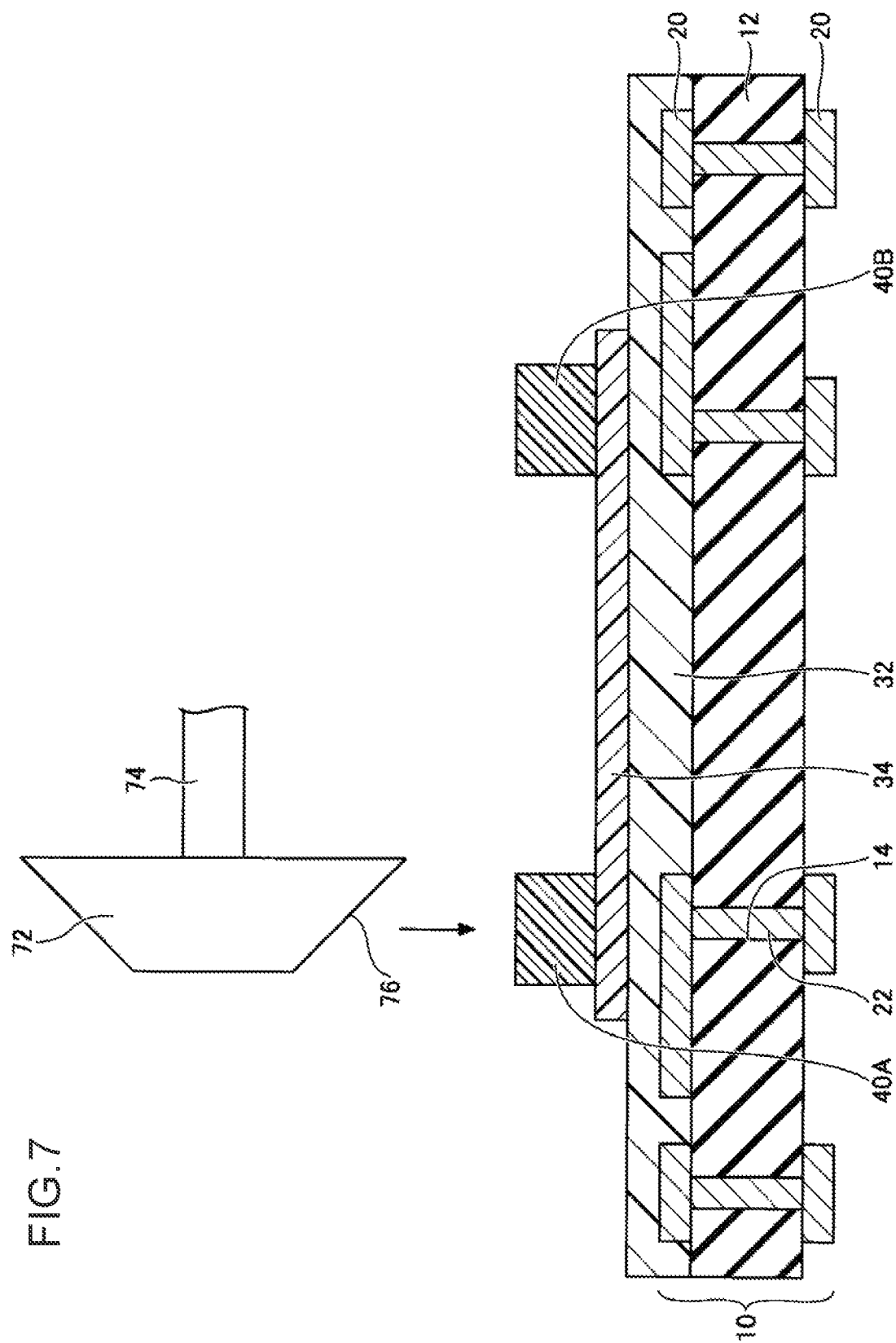
FIG. 7 is a view showing the method for manufacturing the optical waveguide device according to the first embodiment (Part 5)

Successively, a cutting device (not shown) provided with a rotary blade 72 is prepared, as shown in FIG. 7. FIG. 7 is a sectional view. The rotary blade 72 is coupled to a rotary shaft 74 connected to a motor (not shown). The rotary blade 72 has an inclined face 76 at a blade edge, and can form an inclined face in a workpiece.

In addition, the rotary blade 72 and the rotary shaft 74 are connected to a moving unit (not shown) and can move in a vertical direction and a horizontal direction. Thus, the rotary blade 72 which has been adjusted to a predetermined height position can move in the horizontal direction to cut the workpiece.

Figure 8:
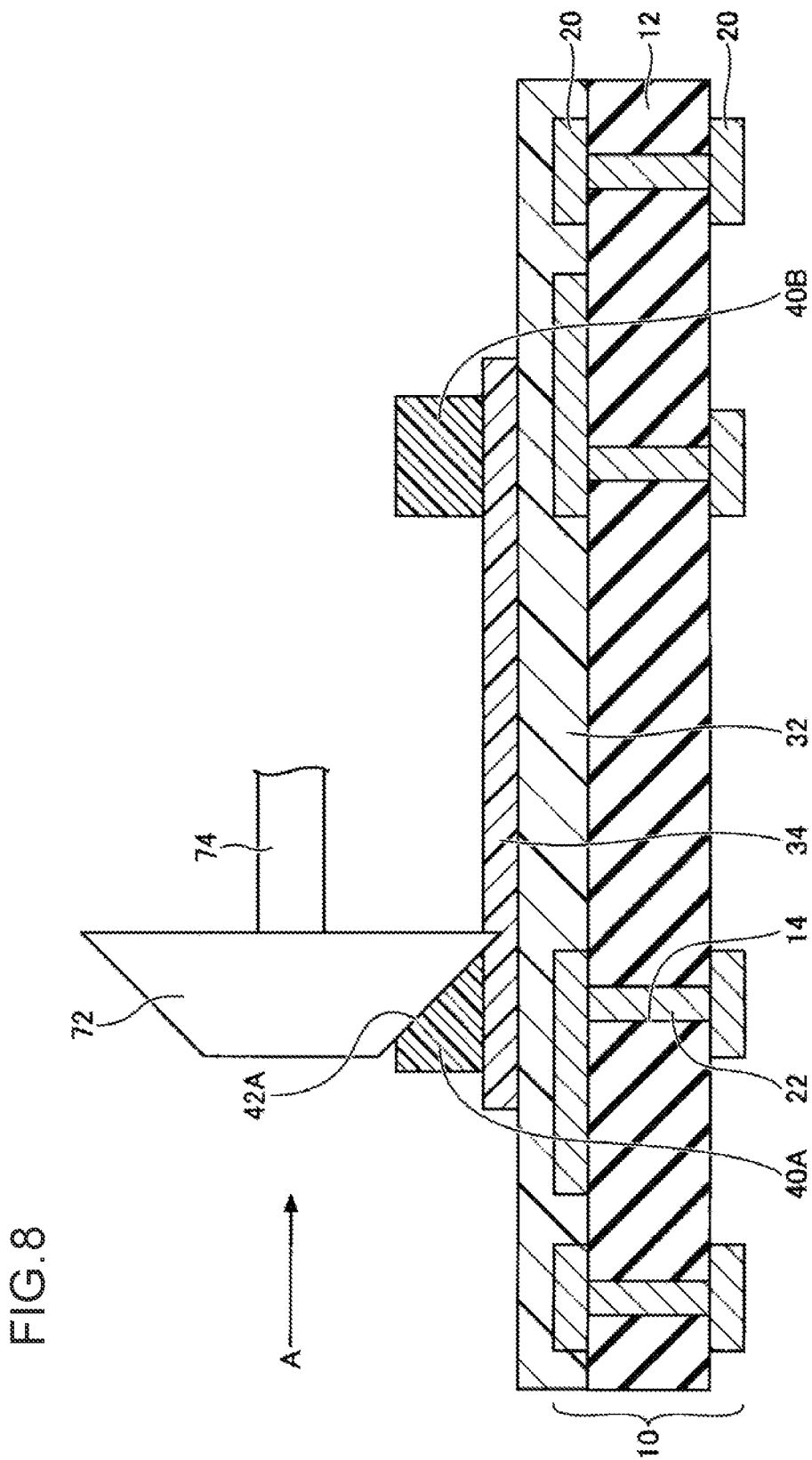
FIG. 8 is a view showing the method for manufacturing the optical waveguide device according to the first embodiment (Part 6)

By use of the rotary blade 72 of such a cutting device, portions of the protrusions 40A in each of which an optical path converting mirror will be disposed are cut in the thickness direction. As a result, as shown in FIG. 8, an inclined face 42A for converting an optical path by 90° is formed in each of the protrusions 40A. FIG. 8 is a sectional view.

Figure 9A:
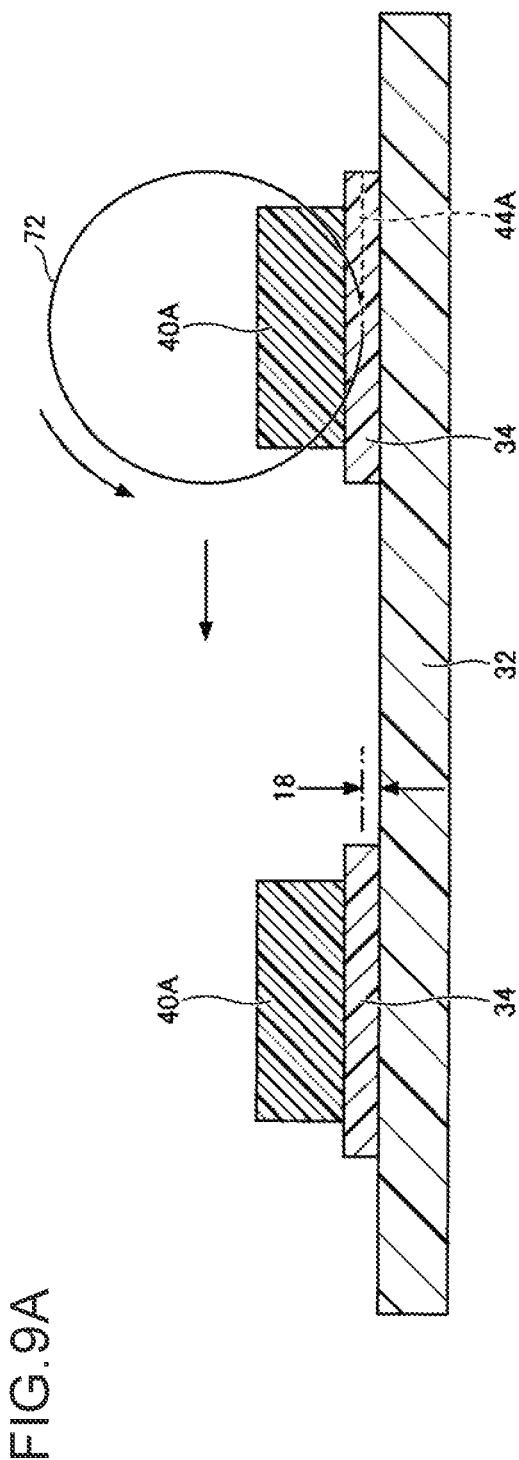
FIGS. 9A and 9B are views showing the method for manufacturing the optical waveguide device according to the first embodiment (Part 7)
Figure 9B:
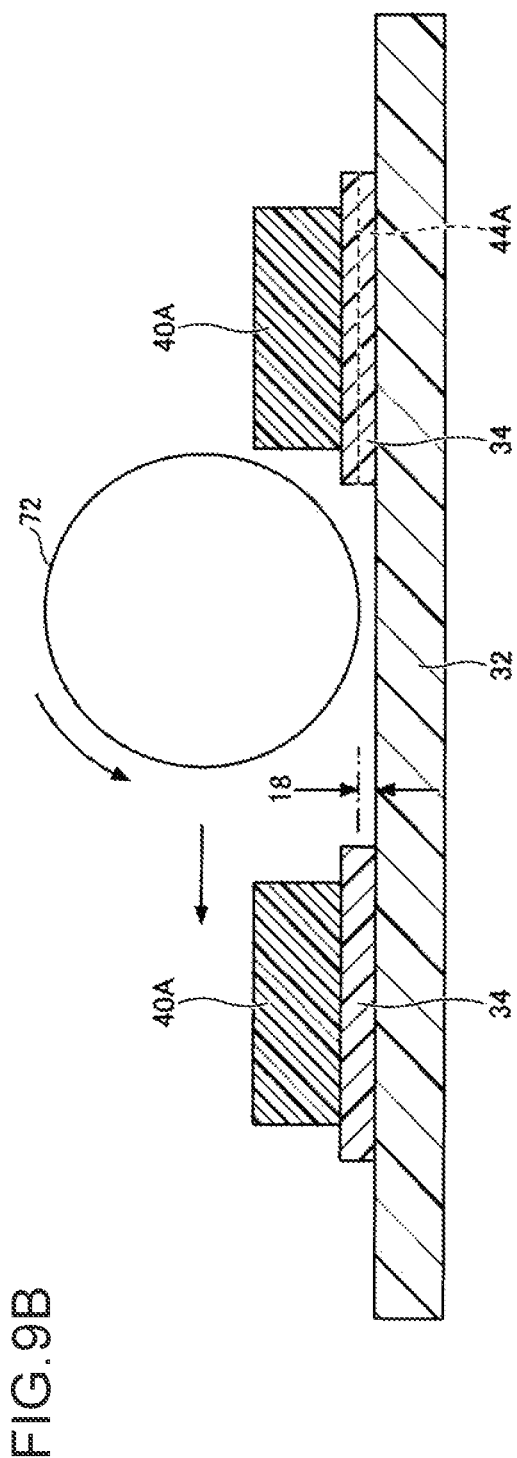

FIGS. 9A and 9B are schematic views seen from a direction A, showing how to form the inclined faces 42A in the protrusions 40A by the rotary blade 72 in the step shown in FIG. 8. In FIGS. 9A and 9B, the rotary blade 72 is drawn in perspective.

As shown in FIGS. 9A and 9B, the second cladding layers 34 are disposed under the protrusions 40A in the present embodiment. Then, the inclined faces 42A are sequentially formed in the protrusions 40A disposed side by side by the rotary blade 72 which is moving in the horizontal direction in a state in which the height position thereof has been adjusted to locate the blade edge thereof in the middle of the thickness of each of the second cladding layers 34. On this occasion, notches 44A continued to the inclined faces 42A are formed in the second cladding layers 34. Each of the notches 44A is formed to extend in the first direction incidentally to the movement of the rotary blade 72.

In this manner, the inclined faces 42A are formed in a batch in the protrusions 40A arranged in parallel. Thus, as shown in FIGS. 9A and 9B, a gap 18 is generated between the cutting edge of the rotary blade 72 and an upper face of the first cladding layer 32 when the rotary blade 72 passes through a region between the plurality of protrusions 40A.

Figure 10A:
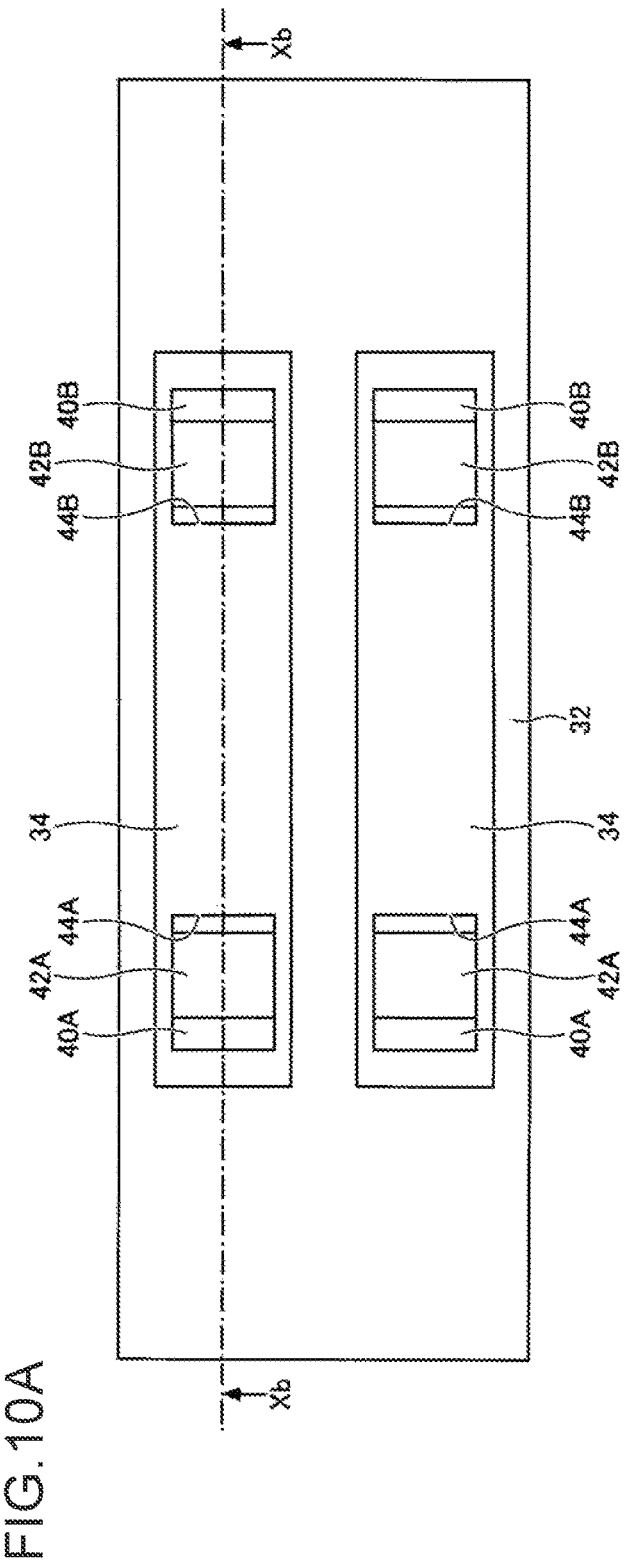
FIGS. 10A and 10B are views showing the method for manufacturing the optical waveguide device according to the first embodiment (Part 8)
Figure 10B:
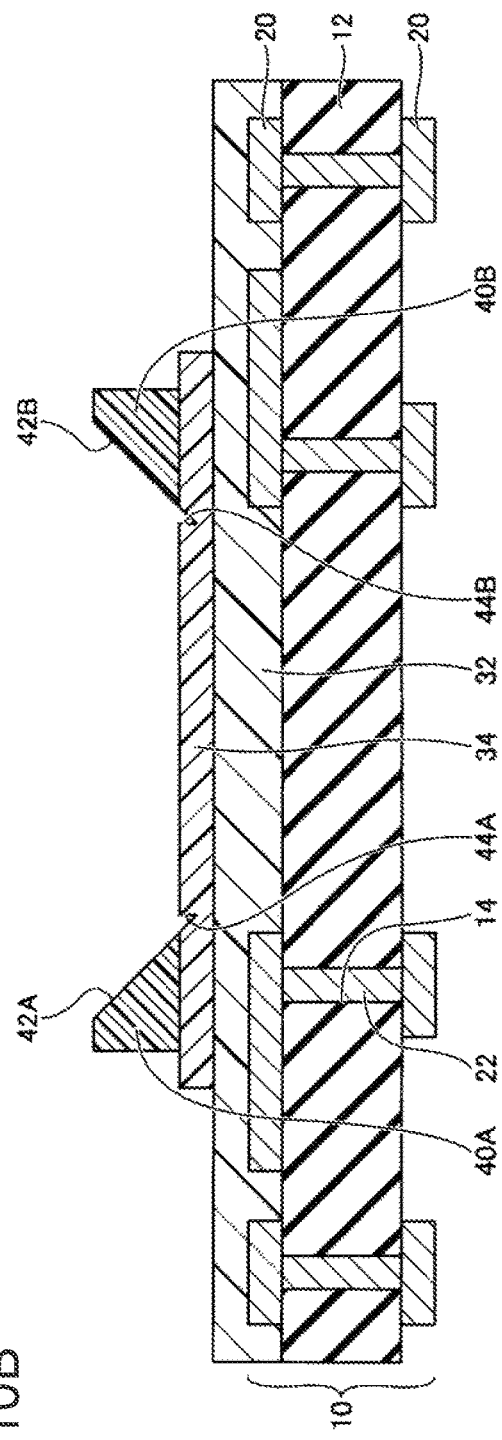

After a direction of the inclined face 76 has been changed, portions of the protrusions 40B in each of which an optical path converting mirror will be disposed are cut in the thickness direction in a similar manner or the same manner by use of the rotary blade 72. As a result, inclined faces 42B are formed in the protrusions 40B, as shown in FIGS. 10A and 10B. On this occasion, notches 44B continued to the inclined faces 42B are formed in the second cladding layers 34. The notches 44B are formed to extend in the first direction according to the movement of the rotary blade 72. FIG. 10A is a top view, and FIG. 10B is a sectional view taken along a line Xb-Xb in FIG. 10A.

In this manner, the second cladding layers 34 are disposed on the first cladding layer 32 to create a local increase in height so as to prevent the first cladding layer 32 from being cut by the rotary blade 72. Therefore, wear of the rotary blade 72 is reduced so that the life of the rotary blade 72 can be prolonged. Accordingly, replacement frequency of the rotary blade 72 can be reduced, so that the cost can be reduced.

Furthermore, since the life of the rotary blade 72 can be prolonged, the good inclined faces 42A and 42B can be formed in the protrusions 40A and 40B with a high yield.

Further, since the second cladding layers 34 are disposed under the cut portions of the protrusions 40A and 40B, the rotary blade 72 can be prevented from reaching the first cladding layer 32. Moreover, even if warpage occurs in the wiring board 10, the thickness of each of the second cladding layers 34 can be adjusted to prevent the rotary blade 72 from reaching the first cladding layer 32.

Thus, the rotary blade 72 can avoid penetrating the first cladding layer 32 and reaching the wiring layer 20 of the wiring board 10. Accordingly, delamination is prevented from occurring at an interface between the wiring layer 20 and the first cladding layer 32 in regions under the notches 44A and 44B.

Figure 11A:
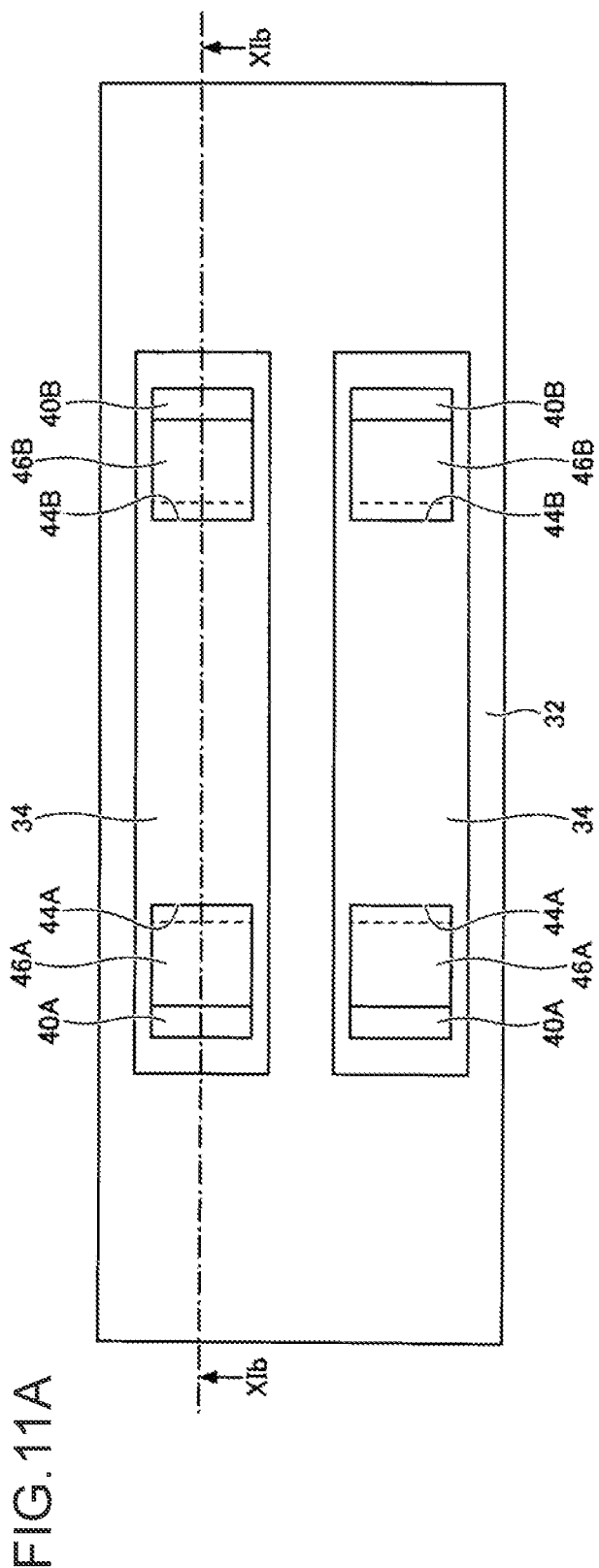
FIGS. 11A and 11B are views showing the method for manufacturing the optical waveguide device according to the first embodiment (Part 9)
Figure 11B:
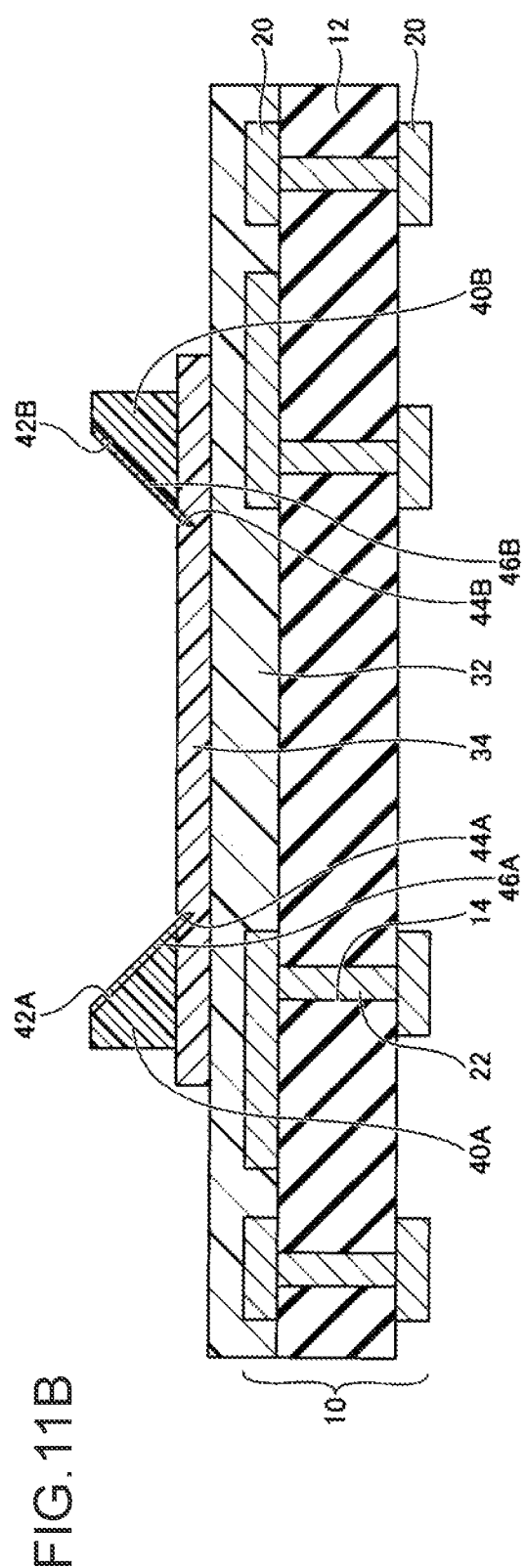

After the inclined faces 42A and 42B are formed, light-reflective metal layers are partially formed on the inclined faces 42A and 42B by mask deposition or the like so as to obtain optical path converting mirrors 46A and 46B respectively, as shown in FIGS. 11A and 11B. FIG. 11A is a top view, and FIG. 11B is a sectional view taken along a line XIb-XIb in FIG. 11A.

Figure 12A:
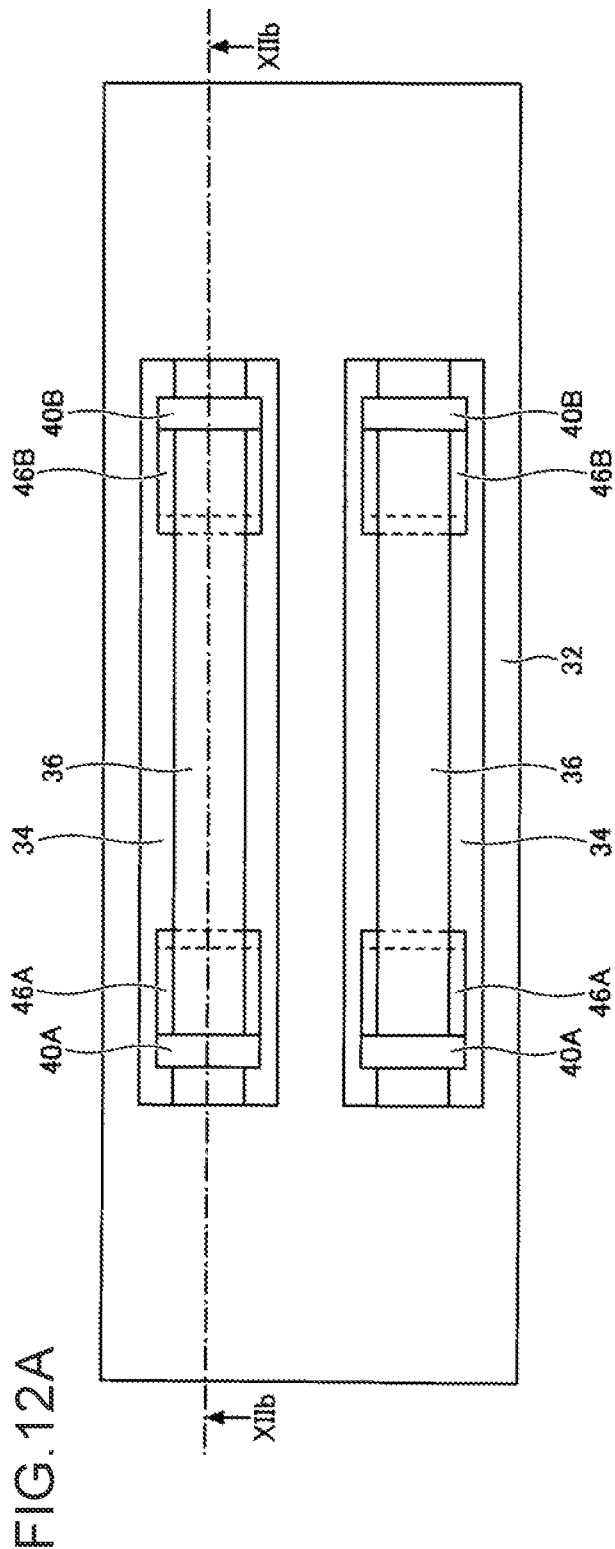
FIGS. 12A and 12B are views showing the method for manufacturing the optical waveguide device according to the first embodiment (Part 10)
Figure 12B:
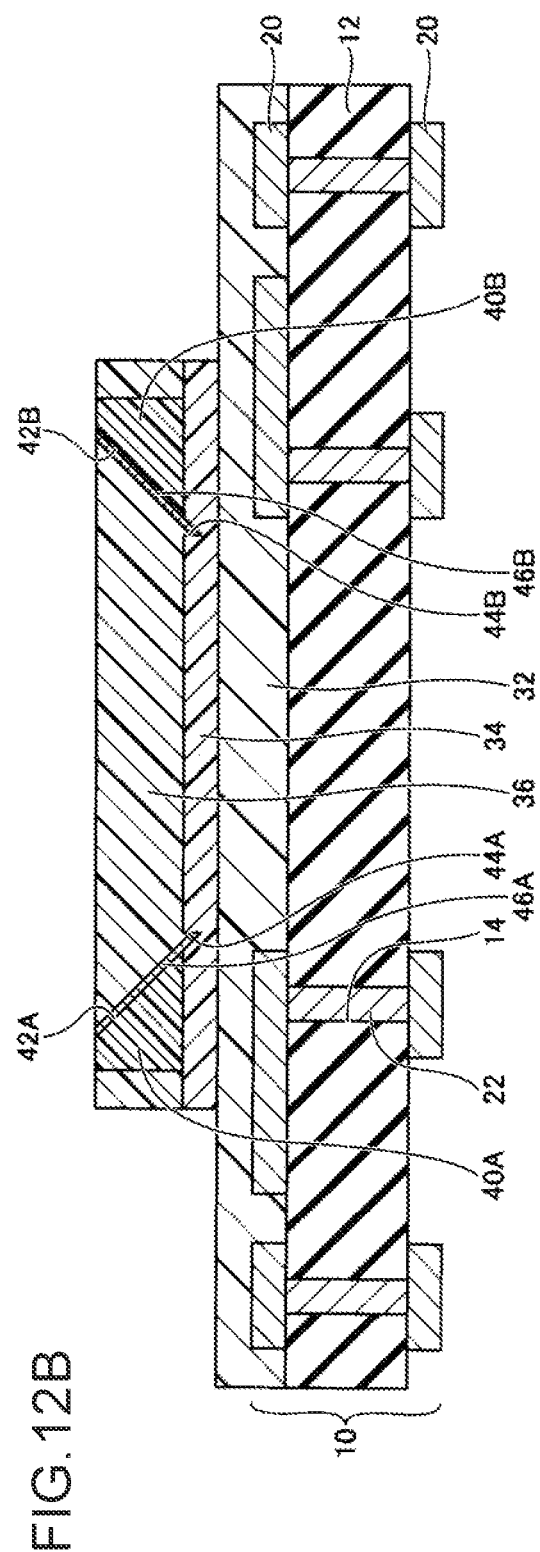

Next, as shown in FIGS. 12A and 12B, core layers 36 are formed on the second cladding layers 34 respectively. FIG. 12A is a top view, and FIG. 12B is a sectional view taken along a line XIIb-XIIb in FIG. 12A. To form the core layers 36, semi-cured (B-stage) photosensitive resin sheets for Obtaining the core layers 36 are provided on the first cladding layer 32 and the second cladding layers 34, and exposed to light and developed based on photolithography. Thereafter, the photosensitive resin sheets are flattened until front faces of the protrusions 40A and 40B are exposed. Successively, the photosensitive resin sheets are cured by a heat treatment at about 100° C. to 140° C.

Next, as shown in FIG. 13A, a third cladding layer 38 covering the core layers 36 is formed on the first cladding layer 32 and the second cladding layers 34, and as shown in FIG. 13B, connection holes 16 are formed in the third cladding layer 38 and the first cladding layer 32, FIGS. 13A and 13B are sectional views.

To form the third cladding layer 38, a photosensitive resin layer (not shown) for Obtaining the third cladding layer 38 is formed on the first cladding layer 32, the second cladding layers 34, and the core layers 36, and exposed to light and developed based on photolithography. Thereafter, the photosensitive resin layer is cured by a heat treatment at about 100° C. to 140° C.

To form the connection holes 16, for example, the third cladding layer 38 and the first cladding layer 32 are processed by a laser. The connection holes 16 are formed to reach the wiring layer 20 of the wiring board 10.

The connection holes 16 may be formed by photolithography. In this case, first holes are formed on the wiring layer 20 of the wiring board 10 in the step of forming the first cladding layer 32 (see FIGS. 4A and 4B), and second holes communicating with the first holes of the first cladding layer 32 are formed in the step of forming the third cladding layer 38 (see FIG. 13A). Thus, each of the connection holes 16 is formed from the first hole and the second hole.

Successively, connection pads 24 connected to the wiring layer 20 of the wiring board 10 through via conductors inside the connection holes 16 are formed on the third cladding layer 38 (see FIG. 1 and FIGS. 2A and 2B).

The connection pads 24 are formed, for example, by a semi-additive method. To explain in detail, first, a seed layer (not shown) is formed in the connection holes 16 and on the third cladding layer 38. Next, a plating resist layer (not shown) provided with opening portions in regions including the connection holes 16 is formed on the seed layer. Thereafter, a metal plating layer (not shown) is formed in the opening portions of the plating resist layer including the inside of the connection holes 16 by electrolytic plating using the seed layer as a plating power feed path. Furthermore, after the plating resist layer is released, the seed layer is etched using the metal plating layer as a mask. Thus, the connection pads 24 are formed from the seed layer and the metal plating layer.

In this manner, an optical waveguide device 1 according to the first embodiment can be manufactured.

As shown in FIG. 1 and FIGS. 2A and 2B, in the optical waveguide device 1 according to the first embodiment, each of the second cladding layers 34 is disposed between a corresponding one of the core layers 36 and the first cladding layer 32. The second cladding layer 34 serves as a protective layer that prevents the underlying first cladding layer 32 from being cut when the inclined faces 42A and 42B are formed in the protrusions 40A and 40B by the rotary blade 72. Therefore, the rotary blade 72 can avoid penetrating the first cladding layer 32 and reaching the wiring layer 20 of the wiring board 10. Therefore, delamination is prevented from occurring at the interface between the wiring layer 20 and the first cladding layer 32 in the regions under the optical path converting mirrors 46A and 46B. Thus, reliability of the optical waveguide device can be improved.

In addition, the core layers 36 directly contact the optical path converting mirrors 46A and 46B. Therefore, attenuation of light can be reduced compared to a case where other materials such as cladding layers are interposed between the core layers 36 and the optical path converting mirrors 46A and 46B.

Incidentally, it is not necessary that both the combination of the protrusion 40A and the optical path converting mirror 46A and the combination of the protrusion 40B and the optical path converting mirror 46B are provided on each of the second cladding layers 34. For example, one of the two combinations may not be provided but replaced by an optical fiber optically coupled to the core layer 36.

Embodiment 2

Figure 14:
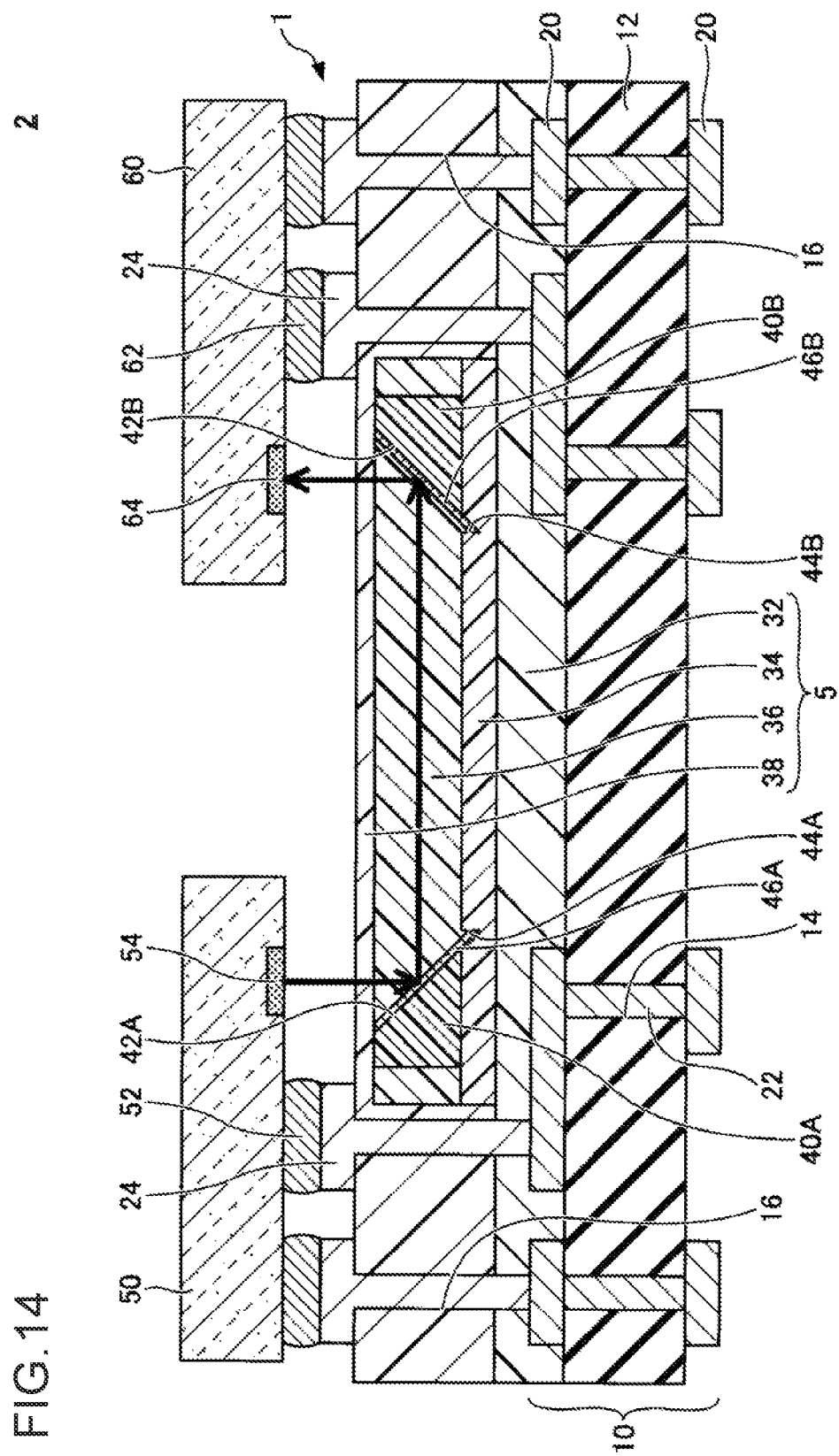
FIG. 14 is a sectional view showing an optical communication apparatus according to a second embodiment.

Next, a second embodiment will be described. The second embodiment relates to an optical communication apparatus provided with an optical waveguide device. FIG. 14 is a sectional view showing the optical communication apparatus according to the second embodiment.

As shown in FIG. 14, in the optical communication apparatus 2 according to the second embodiment, a light-emitting element 50 is connected to connection pads 24 on one end sides of the core layers 36 of an optical waveguide device 1 by solder electrodes 52. The light-emitting element 50 is provided with a plurality of light-emitting portions 54 in its lower face, and the light-emitting portions 54 are optically coupled to optical path converting mirrors 46A of optical paths of the optical waveguide device 1. A vertical cavity surface emitting laser (VCSEL) is suitably used as the light-emitting element 50. The light emitting element 50 is an example of an optical element.

In addition, a light-receiving element 60 is connected to connection pads 24 on the other end sides of the core layers 36 of the optical waveguide device 1 by solder electrodes 62. The light-receiving element 60 is provided with a plurality of light-receiving portions 64 in its lower face, and the light-receiving portions 64 are optically coupled to optical path converting mirrors 46B of the optical paths of the optical waveguide device 1. A photodiode is suitably used as the light-receiving element 60, The light-receiving element 60 is an example of an optical element.

In the optical communication apparatus 2, an electrical signal outputted from a not-shown driver element is supplied to the light-emitting element 50, and light is emitted downward from one of the light-emitting portions 54 of the light-emitting element 50, as indicated by an arrow path in FIG. 14. The light emitted from the light-emitting element 50 is transmitted through a third cladding layer 38 to reach a corresponding one of the optical path converting mirrors 46A of the optical waveguide device 1. Further, the light is reflected by the optical path converting mirror 46A so that the light whose path has been converted by 90° is incident on the core layer 36.

The light incident on the core layer 36 is totally reflected repeatedly to propagate inside the core layer 36 to reach a corresponding one of the optical path converting mirrors 46B on the other end side. Then, the light is reflected by the optical path converting mirror 46B on the other end side so that the light whose path has been converted by 90° is transmitted through the third cladding layer 38 to be incident on a corresponding one of the light-receiving portions 64 of the light-receiving element 60. The light-receiving element 60 converts the optical signal into an electrical signal, and the electrical signal is supplied to a not-shown amplifier element.

In the optical communication apparatus 2, delamination in the regions under the optical path converting mirrors 46A and 46B does not occur. Accordingly, the optical communication apparatus 2 can be manufactured with a high yield, and high reliability of the optical coupling to the optical elements can be obtained.

Incidentally, a gap on each of lower sides of the light-emitting element 50 and the light-receiving element 60 may be filled with an underfill resin.

Although the preferred embodiments or the like have been described above in detail, the present disclosure is not limited to the above mentioned embodiments, and various modifications and substitutions can be added to the aforementioned embodiments or the like without departing from the scope of Claims.

Various aspects of the subject matter described herein are set out non-exhaustively in the following numbered clauses:

1) A method of manufacturing an optical waveguide device, the method comprising:
   forming a first cladding layer on a wiring board;
   selectively forming a second cladding layer on the first cladding layer;
   forming a protrusion on the second cladding layer;
   cutting the protrusion and the second cladding layer by a rotary blade to thereby form an inclined face in the protrusion, wherein the inclined face is inclined to a front face of the second cladding layer;
   forming an optical path converting mirror on the inclined face;
   forming a core layer on the second cladding layer, wherein the core layer directly contacts the optical path converting mirror; and
   forming a third cladding layer on the second cladding layer and the core layer.

2) The method according to Clause (1), wherein
   the second clad layer comprises a plurality of second cladding layers that are arranged in a first direction,
   the protrusion comprises a plurality of protrusions that are arranged in the first direction,
   each of the protrusions is formed on a corresponding one of the second cladding layers, and
   the protrusions and the second cladding layers arranged in the first direction are cut using the rotary blade moving in the first direction, so that the inclined face is formed in each of the protrusions.

What is claimed is:

1. An optical waveguide device comprising:
   a wiring board;
   a first cladding layer that is formed on the wiring board;
   a plurality of second cladding layers that are formed on the first cladding layer;
   a plurality of protrusions each of which is formed on a corresponding one of the second cladding layers and each of which is provided with an inclined face inclined to a front face of the corresponding second cladding layer;
   a plurality of optical path converting mirrors each of which is formed on a corresponding one of the inclined faces of the protrusions;
   a plurality of core layers each of which is formed on a corresponding one of the second cladding layers and each of which directly contacts the corresponding optical path converting mirror; and
   a third cladding layer that is formed on the second cladding layers and the core layers.

2. The optical waveguide device according to claim 1, wherein
   the second cladding layers are arranged in a first direction, and
   the protrusions are arranged in the first direction.

3. The optical waveguide device according to claim 1, wherein
   the second cladding layers and the core layers extend in a second direction orthogonal to the first direction.

4. The optical waveguide device according to claim 1, wherein
   a notch is formed in each of the front faces of the second cladding layers, and
   the notch extends in the first direction, and is adjacent to the corresponding inclined face.

5. The optical waveguide device according to claim 1, wherein
   the protrusions comprise a plurality of pairs of protrusions,
   each of the pairs of protrusions is formed on a corresponding one of the second cladding layers,
   the optical path converting mirrors comprise a plurality of pairs of optical path converting mirrors; and each of the pairs of optical path converting mirrors is formed on a corresponding one of the second cladding layers.

6. An optical communication apparatus comprising:
an optical waveguide device comprising:
   a wiring board;
   a first cladding layer that is formed on the wiring board;
   a plurality of second cladding layers that are formed on the first cladding layer;
   a plurality of protrusions each of which is formed on a corresponding one of the second cladding layers and each of which is provided with an inclined face inclined to a front face of the corresponding second cladding layer;
   a plurality of optical path converting mirrors each of which is formed on a corresponding one of the inclined faces of the protrusions;
   a plurality of core layers each of which is formed on a corresponding one of the second cladding layers and each of which directly contacts the corresponding optical path converting mirror; and
   a third cladding layer that is formed on the second cladding layers and the core layers, and
a plurality of optical elements each of which is optically coupled to the corresponding optical path converting mirror.

7. An optical waveguide device comprising:
a wiring board;
a first cladding layer that is formed on the wiring board;
a plurality of second cladding layers that are formed on the first cladding layer;
a plurality of first protrusions each of which is formed on a corresponding one of the second cladding layers and each of which is provided with a first inclined face inclined to a front face of the corresponding second cladding layer;
a plurality of second protrusions each of which is formed on a corresponding one of the second cladding layers and each of which is provided with a second inclined face inclined to a front face of the corresponding second cladding layer;
a plurality of first optical path converting mirrors each of which is formed on a corresponding one of the inclined faces of the first protrusions;
a plurality of second optical path converting mirrors each of which is formed on a corresponding one of the inclined faces of the second protrusions;
a plurality of core layers each of which is formed on a corresponding one of the second cladding layers and each of which directly contacts the corresponding first optical path converting mirror and the corresponding second optical path converting mirror; and
a third cladding layer that is formed on the second cladding layers and the core layers.

8. The optical waveguide device according to claim 7, wherein:
   each of the first optical path converting mirrors faces a corresponding one of the second optical path converting mirrors;
   each of the first optical path converting mirrors faces a corresponding one of light-emitting elements, and is configured to reflect light emitted from the corresponding light-emitting element toward the corresponding second optical path converting mirror through the corresponding core layer; and
   each of the second optical path converting mirrors faces a corresponding one of light-receiving elements, and is configured to reflect light coining from the corresponding first optical path converting mirror toward the corresponding light-receiving element.

* * * * *